US006863149B2

(12) United States Patent
Shimizu (10) Patent No.: US 6,863,149 B2
(45) Date of Patent: Mar. 8, 2005

(54) STEERING MECHANISM OF ELECTRIC CAR

(75) Inventor: Hiroshi Shimizu, Kamakura (JP)

(73) Assignee: Japan Science and Technology Corporation (JP)

( * ) Notice: Subject to any disclaimer, the term of this patent is extended or adjusted under 35 U.S.C. 154(b) by 0 days.

(21) Appl. No.: 10/433,778

(22) PCT Filed: Oct. 26, 2001

(86) PCT No.: PCT/JP01/09419

§ 371 (c)(1),
(2), (4) Date: Jun. 6, 2003

(87) PCT Pub. No.: WO02/47936

PCT Pub. Date: Jun. 20, 2002

(65) Prior Publication Data

US 2004/0050596 A1 Mar. 18, 2004

(30) Foreign Application Priority Data

Dec. 12, 2000 (JP) ........................................ 2000-377715

(51) Int. Cl.[7] ................................................ B62D 5/06
(52) U.S. Cl. ....................... 180/446; 180/445; 180/409; 180/413; 280/911; 280/24.01
(58) Field of Search ...................... 701/41, 43; 280/91.1, 280/442, 24.01; 180/408–411, 413, 416, 234–236

(56) References Cited

U.S. PATENT DOCUMENTS

| 5,579,228 A | * | 11/1996 | Kimbrough et al. | .......... 701/41 |
| 5,627,754 A | * | 5/1997 | Asanuma et al. | .......... 701/41 |
| 5,877,455 A | | 3/1999 | Kyrtsos | .......... 177/1 |
| 6,059,056 A | * | 5/2000 | Becker | .......... 180/24.01 |
| 6,131,691 A | * | 10/2000 | Morch | .......... 180/418 |
| 6,308,976 B1 | * | 10/2001 | Mitchell | .......... 280/419 |
| 6,354,394 B1 | * | 3/2002 | Bauer-Nilsen | .......... 180/409 |
| 6,425,452 B1 | * | 7/2002 | Steiner et al. | .......... 180/233 |
| 6,488,114 B1 | * | 12/2002 | McMahon et al. | .......... 180/414 |

FOREIGN PATENT DOCUMENTS

| DE | 3147787 | * | 9/1983 | ............ B62D/7/06 |
| JP | 1-298903 | | 12/1989 | |
| JP | 6-219348 | | 8/1994 | |
| JP | 6-335115 | | 12/1994 | |
| JP | 10-278596 | | 10/1998 | |
| JP | 11-187506 | | 7/1999 | |

* cited by examiner

*Primary Examiner*—Avraham Lerner
(74) *Attorney, Agent, or Firm*—Lorusso, Loud & Kelly (57) ABSTRACT

A steering device for an electric car includes tandem wheel suspensions for at least two sets of tandem wheels and a steering mechanism for each set of tandem wheels and provides a smooth turning motion. The steering mechanism for one tandem set of wheels is formed by a mechanical connection to a steering wheel and the steering mechanism for the second set of tandem wheels is driven by motors.

3 Claims, 9 Drawing Sheets

# STEERING MECHANISM OF ELECTRIC CAR

CROSS-REFERENCE TO RELATED APPLICATIONS

This application is a National Phase Application (35 USC 371) of PCT/JP01/09419 and claims priority of Japanese Application No. 2000-377715 filed Dec. 12, 2000.

TECHNICAL FIELD

The present invention relates to a steering mechanism of an electric car having tandem wheel suspensions.

Figure 1:
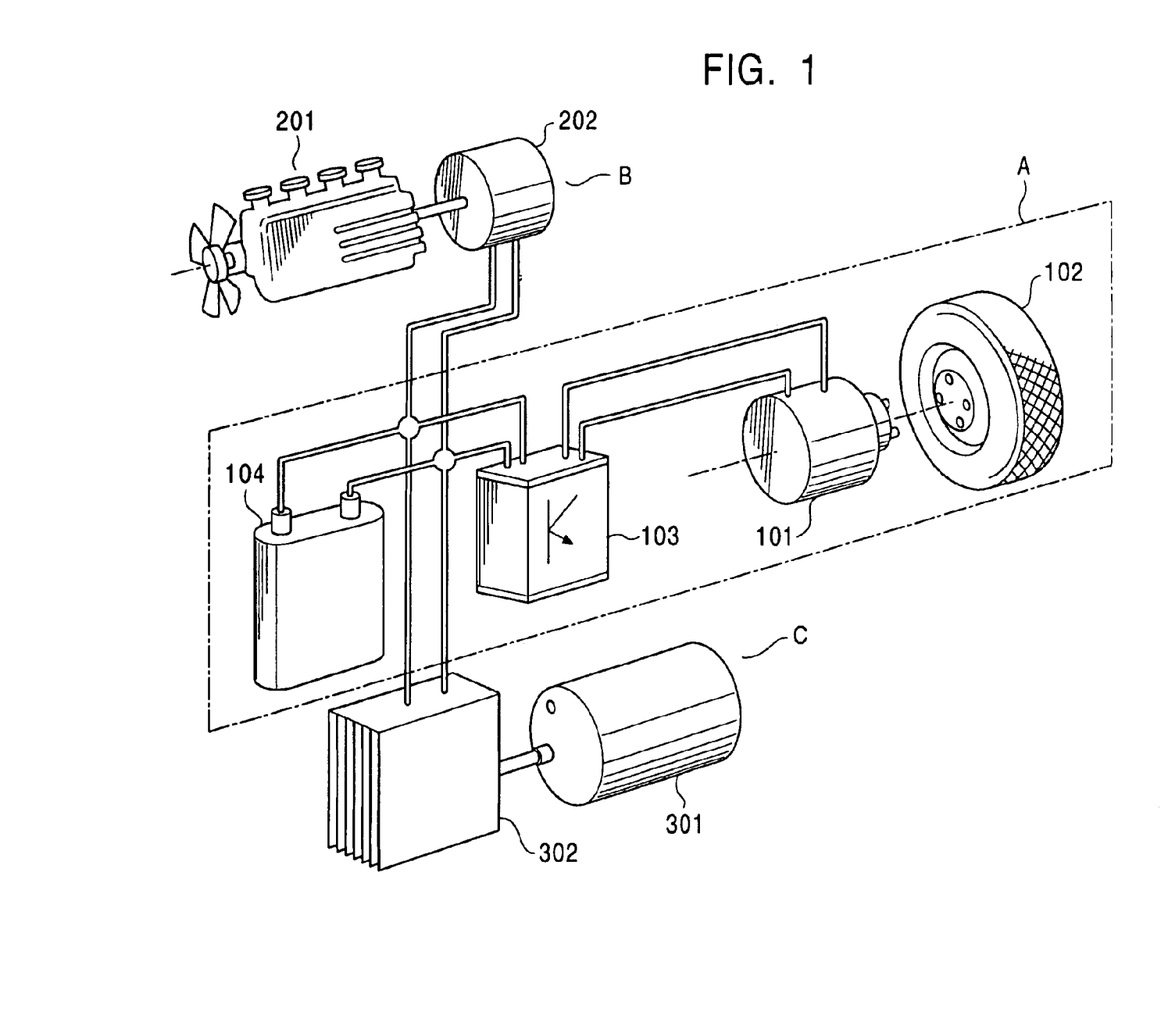
FIG. 1 illustrates the basic structure of an electric car.

As shown in FIG. 1, an electric car is driven by using only a driving force of an electric motor 101. When a secondary battery, an engine generator, or a fuel battery is used as a power source for the electric motor 101, the electric car is referred to as an electric car A in the narrow sense, a series hybrid car B, or a fuel battery car C, respectively. In FIG. 1, the reference numerals 102, 103, 104, 201, 202, 301, and 302 respectively denote a wheel, a controller, a secondary battery, an engine, a generator, a hydrogen feeding source, and a fuel battery.

As mentioned above, since the electric car is driven by using only a driving force of a rotary electric motor, it is defined as a car which uses a secondary battery, a fuel battery, a generator using an internal-combustion engine, a solar battery, and the like, or a combination of at least two of them as a power source for the electric motor. Although the electric car uses only a secondary battery in the following description, those skilled in the art will appreciate that the present invention is also applicable to a car which uses a fuel battery, a generator using an internal-combustion engine, or a solar battery as a power source.

BACKGROUND ART

There is an urgent need to develop a totally electric car as one of decisive factors in preventing air pollution due to motorization. With the understanding that conservation of the natural environment is a big issue in the 21st century, the inventor of the present invention started the development in 1980s and is yielding results.

Meanwhile, the inventor of the present invention has already proposed an electric car having a structure, as one of ideal structures, including an in-wheel drive system, a battery built-in frame (BBF) having a battery built under the floor thereof, and tandem wheel suspensions, each having two separate front and rear wheels mounted thereon in place of one conventional wheel.

The reason for using the tandem wheel suspensions is that use of two wheels in place of a conventional single wheel improves the road holding, thereby providing a large acceleration force. Also, the car can keep running even when some of the wheels are damaged, and an input conveyed from the road surface to a car body through each wheel can be reduced, thereby resulting in higher ride quality.

DISCLOSURE OF INVENTION

When tandem wheel suspensions are employed, since a large number of wheels are needed, it is necessary to convey a steering force of a steering mechanism to the large number of wheels. When a coupling mechanism is provided to each of a second axle, a third axle, a fourth axle, - - - , in addition to a first axle, or when it is possible to steer a plurality of axles, a smooth turning motion can be achieved.

In view of the above-mentioned circumstances, an object of the present invention is to provide a steering mechanism of an electric car, including tandem wheel suspensions and steering means for each pair of right and left wheels so as to achieve a smooth turning motion.

In order to achieve the above object,

[1] the present invention provides a steering mechanism of an electric car, which includes tandem wheel suspensions; and steering means for each pair of right and left wheels, wherein the steering means is formed by steering means operated by a steering wheel and steering means operated by a motor.

[2] The steering mechanism of an electric car set forth in the foregoing [1] further includes a steering wheel angle sensor for detecting a steering angle of the steering wheel; and a general controller for receiving at least an output of the steering wheel angle sensor and for controlling the steering means.

[3] The steering mechanism of an electric car set forth in the foregoing [2] further includes a motor controller for controlling a driving current of the motor of each steering means in accordance with a corresponding control output of the general controller.

[4] In the steering mechanism of an electric car set forth in the foregoing [2], the general controller receives a variable combination of detected values of rotating-position sensors of respective wheels, steer angle sensors of respective pairs of wheels, a yaw-rate sensor, a lateral acceleration sensor, and a longitudinal acceleration sensor in order to control the steering means, in accordance with a control object.

BEST MODE FOR CARRYING OUT THE INVENTION

Preferred embodiments of the present invention will be described with reference to the accompanying drawings.

Figure 2:
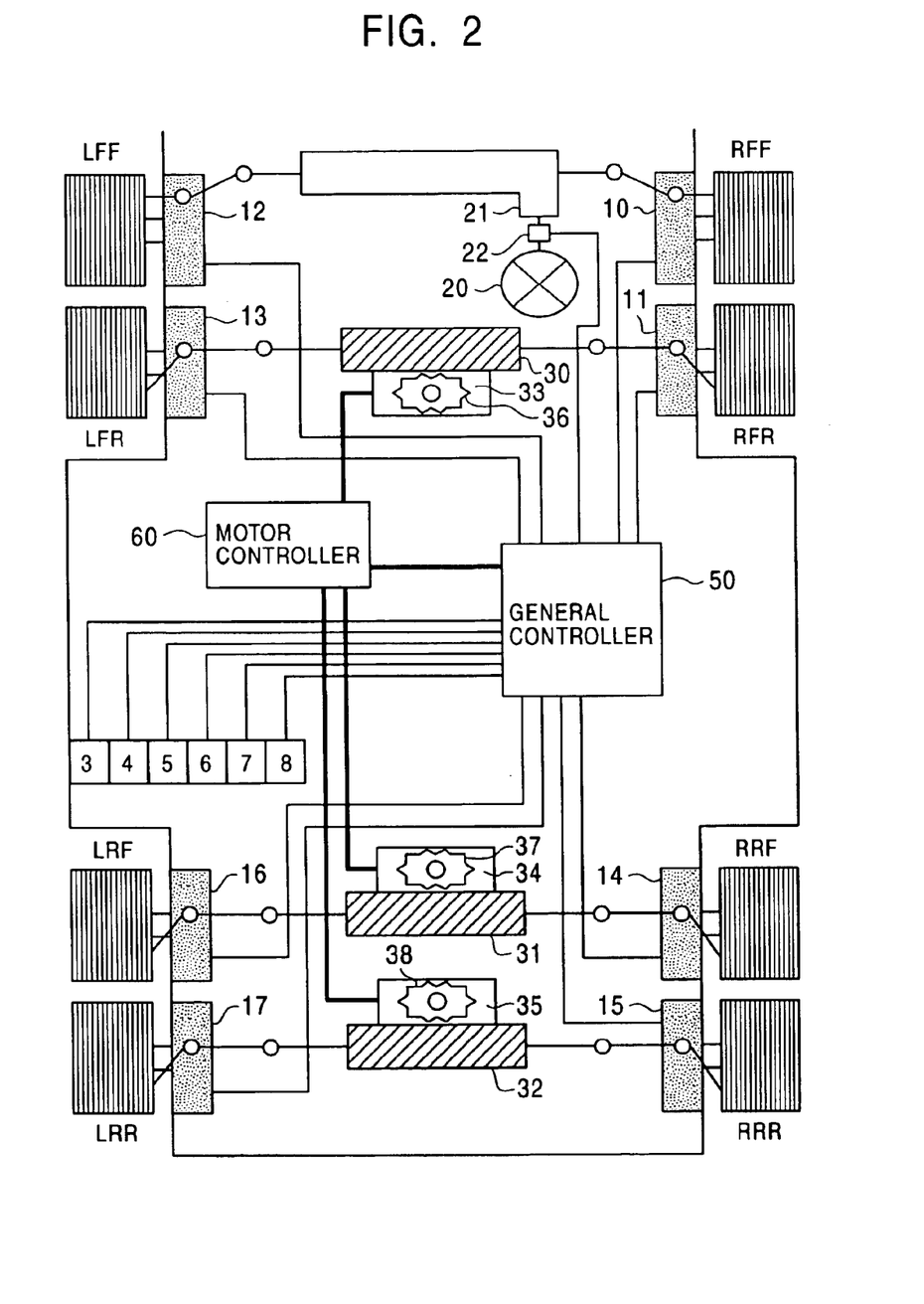
FIG. 2 is a schematic diagram of a steering system which is applicable to a tandem wheel suspension and which is controlled by a general controller and a motor controller according to a first embodiment of the present invention.
Figure 3:
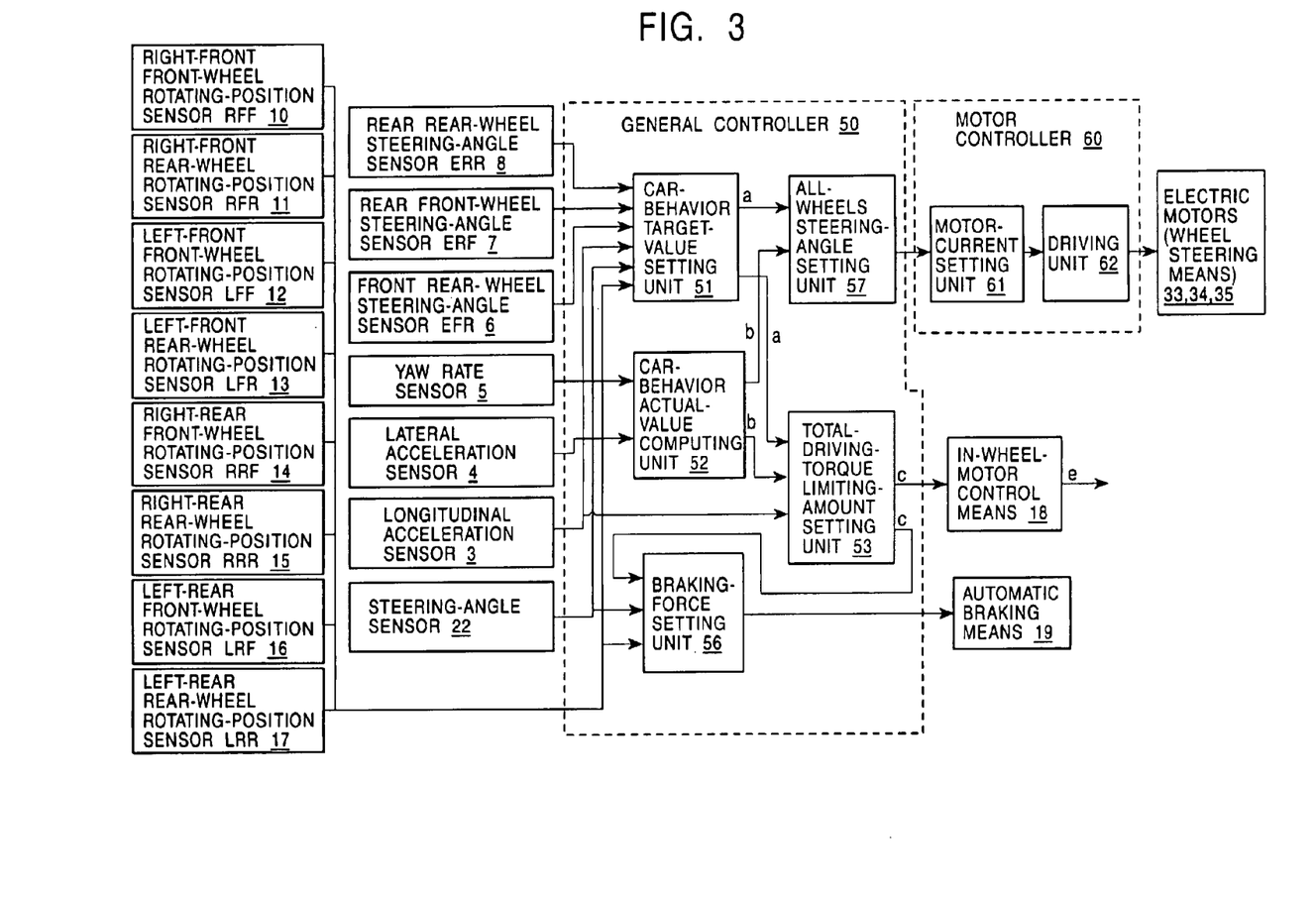
FIG. 3 is a block diagram of the steering system which is applicable to the tandem wheel suspension and which is controlled by the general controller and the motor controller according to the first embodiment of the present invention.

FIG. 2 is a schematic diagram of a steering system which is applicable to a tandem wheel suspension and which is controlled by a general controller and a motor controller according to a first embodiment of the present invention. FIG. 3 is a block diagram of the steering system which is applicable to the tandem wheel suspension and which is controlled by the general controller and the motor controller according to the first embodiment of the present invention.

The present invention is intended for a car having a structure in which at least one set of a tandem wheel suspension is provided at each of the right and left sides of the car, each pair of wheels is always equipped with steering means such as a steering wheel, and six or eight wheels are provided. An embodiment of the present invention will be described on the basis of a car having a structure in which all right and left wheels are equipped with tandem wheel suspensions, and having one set of a steering wheel and the remaining three sets of steering means are provided.

Each wheel has a motor built in its wheel, and each pair of front and rear wheels are suspended by the corresponding tandem wheel suspension. Each pair of right-front and left-front front-wheels RFF and LFF, right-front and left-front rear-wheels RFR and LFR, right-rear and left-rear front-wheels RRF and LRF, and right-rear and left-rear rear-wheels RRR and LRR is controlled as a pair of wheels in steer angle controlling.

The wheels have rotating-position sensors 10 to 17 attached on the corresponding axles thereof, and outputs of these rotating-position sensors are input into a general controller 50.

Front front-wheel steering means is constructed such that the front front-wheels RFF and LFF are manually steered when a steering wheel 20 is operated so as to activate a power steering 21 and so forth.

Front rear-wheel steering means has an electric motor 33 and is constructed such that the electric motor 33 is coupled with right and left traveling axles via a speed-reduction worm gear 36 and rotation-travel converting means 30 which are rotatably disposed on the motor axle, and both ends of the traveling axles such as tie-rods are coupled with the front rear-wheels RFR and LFR via corresponding levers, knuckle arms, and so forth, and the front rear-wheel steering means is driven by the motor so as to directly achieve the automatic steering of the front rear-wheels.

Rear front-wheel steering means has an electric motor 34 and is constructed such that the electric motor 34 is coupled with right and left traveling axles via a speed-reduction worm gear 37 and rotation-travel converting means 31 which are rotatably disposed on the motor axle, and both ends of the traveling axles are coupled with the rear front-wheels RRF and LRF via corresponding levers, knuckle arms, and so forth, and the rear front-wheel steering means is driven by the motor so as to directly achieve the automatic steering of the rear front-wheels.

Rear rear-wheel steering means has an electric motor 35 and is constructed such that the electric motor 35 is coupled with right and left traveling axles via a speed-reduction worm gear 38 and rotation-travel converting means 32 which are rotatably disposed on the motor axle, and both ends of the traveling axles are coupled with the rear rear-wheels RRR and LRR via corresponding levers, knuckle arms, and so forth, and the rear rear-wheel steering means is driven by the motor so as to directly achieve the automatic steering of the rear rear-wheels.

When the power source of these motors is turned off when the car malfunctions, the irreversibility of the worm gears 36, 37, and 38 allows each pair of the corresponding wheels RFR and LFR, RRF and LRF, and RRR and LRR to be held in a predetermined steer angle state against an external force from the road surface.

A control system includes the rotating-position sensors 10 to 17 for detecting wheel speeds N of corresponding eight wheels, a steering wheel angle sensor 22 for detecting a steering wheel angle θ of the steering wheel, a front rear-wheel steer angle sensor 6 for detecting a front rear-wheel steer angle EFR, a rear front-wheel steer angle sensor 7 for detecting a rear front-wheel steer angle ERF, a rear rear-wheel steer angle sensor 8 for detecting a rear rear-wheel steer angle ERR, a longitudinal acceleration sensor 3 for detecting a longitudinal acceleration Gx of the car, a lateral acceleration sensor 4 for detecting a lateral acceleration Gy of the car, and a yaw rate sensor 5 for detecting a yaw rate γ, that is, a turning angular speed, in accordance with the turning state of the car. Sensor signals from these sensors are input into the general controller 50 so as to be electrically processed in a comprehensive manner.

Also, the control system includes an independent motor controller 60 for controlling a large motor current of each of the electric motors 33, 34, and 35. Thus, the control system is constructed such that the general controller 50 outputs a drive control signal of each motor, a brake signal, and a differential limiting signal so as to output steering control signals to the motor controller 60.

The general controller 50 will be now described with reference to FIG. 3.

The general controller 50 has a car-behavior target-value setting unit 51 into which the wheel speeds N, the steering wheel angle θ, the front rear-wheel steer angle EFR, the rear front-wheel steer angle ERF, the rear rear-wheel steer angle ERR, and the longitudinal acceleration Gx are input. The car-behavior target-value setting unit 51 computes a vehicle speed; determines the running state of the accelerated or decelerated car, the steering states of the front rear-wheels RFR and LFR, the rear front-wheels RRF and LRF, and the rear rear-wheels RRR and LRR, and so forth; and, on the basis of these parameters, numerically sets target values a for achieving a good car behavior, for example, high stability at high speed or when decelerating and a good turning ability at low speed. Also, the general controller 50 has a car-behavior actual-value computing unit 52, into which the lateral acceleration Gy and the yaw rate γ are input, for numerically computing actual values b representing the changing state of the car when the behavior of the car actually changes due to a disturbance generated when the car is turning or caused by a crosswind.

The foregoing target values a and actual values b about the car behavior, the wheel speeds N, the longitudinal acceleration Gx are input into a total-driving-torque limiting-amount setting unit 53. The total-driving-torque limiting-amount setting unit 53 numerically determines the stable or unstable degree of the car behavior by comparing the target values a and the corresponding actual values b at every step of the vehicle speed when accelerating. In the unstable state where one of the actual values b falls outside the corresponding target value a, the total-driving-torque limiting-amount setting unit 53 computes a total-driving-torque limiting amount c in accordance with a difference in these mutually corresponding values and outputs a motor control signal to in-wheel-motor control means 18 in accordance with the limiting amount c.

The wheel speeds N, the longitudinal acceleration Gx, and the total-driving-torque limiting amount c are input into a braking-force setting unit 56. The braking-force setting unit 56 checks the total-driving-torque limiting amount c by referring to the car speed and the acceleration state. When the limiting amount c is large, the braking-force setting unit 56 sets a brake force f, and sends a brake signal of the brake force f to an automatic braking means 19.

Furthermore, since the steering of the front rear-wheels, the rear front-wheels, and the rear rear-wheels significantly affects on the stability and the turning ability of the car behavior, the target values a and the actual values b are input into an all-wheels steer angle setting unit 57. The all-wheels steer angle setting unit 57 computes a target front rear-wheel steer angle EFR, rear front-wheel steer angle ERF, and rear rear-wheel steer angle ERR in the same fashion as in the above mentioned in accordance with differences in the target values a and the corresponding actual values b, and outputs steering control signals of the target front rear-wheel steer angle EFR, rear front-wheel steer angle ERF, and rear rear-wheel steer angle ERR to the motor controller 60.

The motor controller 60 has a motor-current setting unit 61, into which steering control signals are input, for deciding target motor currents It in accordance with the front rear-wheel steer angle EFR, rear front-wheel steer angle ERF, and rear rear-wheel steering-angle ERR. Current signals of these motor currents It are input into a driving unit 62 so as to feed predetermined large motor currents I to the electric motors 33, 34, and 35.

When the car is operated by a driver so as to run straight or turn with the eight drive wheels while being accelerated or decelerated, signals of the various sensors are always input into the general controller 50 for setting the target values a and computing the actual values b of the car behavior. The general controller 50 sets in-wheel-motor driving currents e of the right and left motors and target wheel steer angles E of the right and left wheels on the basis of the target values a and the actual values b of the car behavior. While the car is running straight or turning, when the car behavior becomes unstable when one of the actual values b falls outside the corresponding target value a, the driving currents e in accordance with differences in these mutually corresponding values are output to right and left in-wheel motors, thereby limiting unnecessary movements of the right and left wheels and thus performing a drive control so as to achieve the car stability.

Meanwhile, while the car is running straight, when the car behavior becomes unstable when one of the actual values b falls outside the corresponding target value a due to a crosswind or the like, the target front rear-wheel steer angles E are set in accordance with differences in these mutually corresponding values and steering control signals of the above target front rear-wheel steer angles E are output to the motor controller 60. Then, in the motor controller 60, the target motor currents It are set in accordance with the target front rear-wheel steer angles E and a large motor current is fed to an electric motor 33 of the rotation-travel converting means 30 by the driving unit 62.

With this arrangement, due to torques generated by the in-wheel-motor driving currents e of the right and left in-wheel motors, the corresponding front rear-wheels, rear front-wheels, and rear rear-wheels are directly driven and steered in a predetermined relationship, thereby performing a steering control so as to achieve the car stability. Also, when the car is turned at very low speed, the rear front-wheels and the rear rear-wheels are driven to steer in anti-phase with each other side by the corresponding in-wheel motors so as to achieve a small turning motion.

Although a steering control of each pair of wheels is performed by an electric motor equipped with a worm gear to which the general controller 50 sends a command on the basis of an output of the steering wheel angle sensor 22 in the foregoing embodiment, a variety of modifications are possible. For example, instead of the steering means formed by the motor equipped with a worm gear and the rotation-travel converting means, steering means formed by steering wheels, that is, steering means formed by a plurality of steering wheels is provided so as to be operative mutually with steering means formed by the remaining motors.

A servomechanism for performing the steering of the car is of an electric type. The servomechanism is fixed to only one of the steering shafts and its force is distributed to each of the steering shafts or fixed to each of the steering shafts. A flexible wire is sometimes used to convey a force from the steering wheel to each of the steering shafts, and another flexible wire is sometimes used to convey a force from one steering shaft to another shaft. The rearmost steering shaft is steered in anti-phase phase at low speed and in phase at high speed with the foremost steering shaft.

In order to transmit a command for performing the steering from the steering wheel to each steering system, mechanical transmitting means, electrical transmitting means, or sound waves are used. The servomechanism for performing the steering is sometimes directly fixed to a kingpin without having a steering rod interposed therebetween. The shafts of the kingpins are sometimes connected to each other by a rigid member, wire, or the like for the safety of the car.

Figure 4:
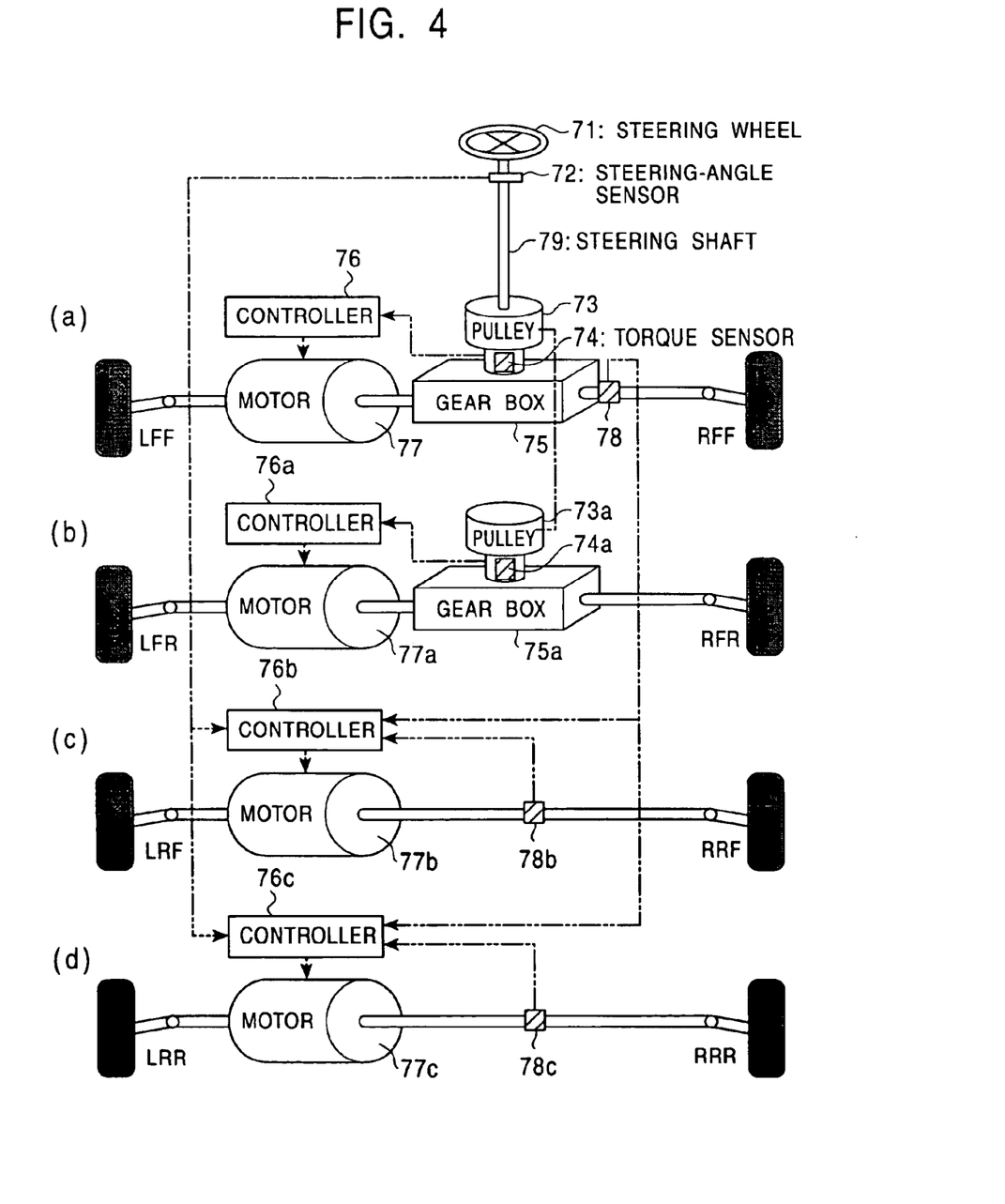
FIG. 4 illustrates a steer angle control system according to a second embodiment of the present invention, characterized by a structure for transmitting steering data.

Referring now to FIG. 4, a second embodiment of the present invention will be described.

As shown in FIG. 4, a steering angle of a steering wheel 71 is transmitted to a steering wheel angle sensor (a rotary encoder) 72, a pulley 73, a torque sensor (a torsional torque sensor) 74, and a gear box 75. The rotation angle transmitted to the gear box 75 is transmitted to tie-rods or the like via the corresponding steering shaft having a motor 77 disposed thereon so as to steer the corresponding wheels. At the same time, a servo force of the motor 77 is fed back to the torque sensor 74 via the gear box 75 so as to perform a feedback control. In conjunction with the feedback control, the following steer angle controls (1) and (2) are performed.

(1) Upon receiving detected values of a steer angle sensor 78 and the steering wheel angle sensor (such as a rotary encoder or a potentiometer) 72, fixed to a steering shaft 79, for detecting a steering angle of the steering wheel 71, controllers for controlling the steering shafts of the other wheels, in particular, controllers 76b and 76c for controlling the steering shafts of the right-rear and left-rear front-wheels and the right-rear and left-rear rear-wheels issue commands to motors 77b and 77c so as to produce a servo effect, and also perform a feedback control by feeding back detected values of steer angle sensors (such as rotary encoders or potentiometers) 78b and 78c to themselves, respectively.

(2) A gear box 75a, to which a servo-motor 77a, a pulley 73a, and a torque sensor 74a are connected, is disposed on the steering shaft of the right-front and left-front rear-wheels. Since the pulley 73a is coupled with the pulley 73 by a wire, the steering angle of the steering wheel 71 can be reproduced. A steering force is detected by the torque sensor 74a. On the basis of the detected value, the controller 76a issues a command to the motor 77a so as to produce a servo effect, and also perform a feedback control by feeding back the detected value to the torque sensor 74a via the gear box 75a.

Since the detected value of the steering wheel 71 is transmitted by the above mentioned electrical means and mechanical means which are different from each other, even when one of the transmission systems malfunctions, the steering of the car can be still maintained by the other transmission system.

Figure 5:
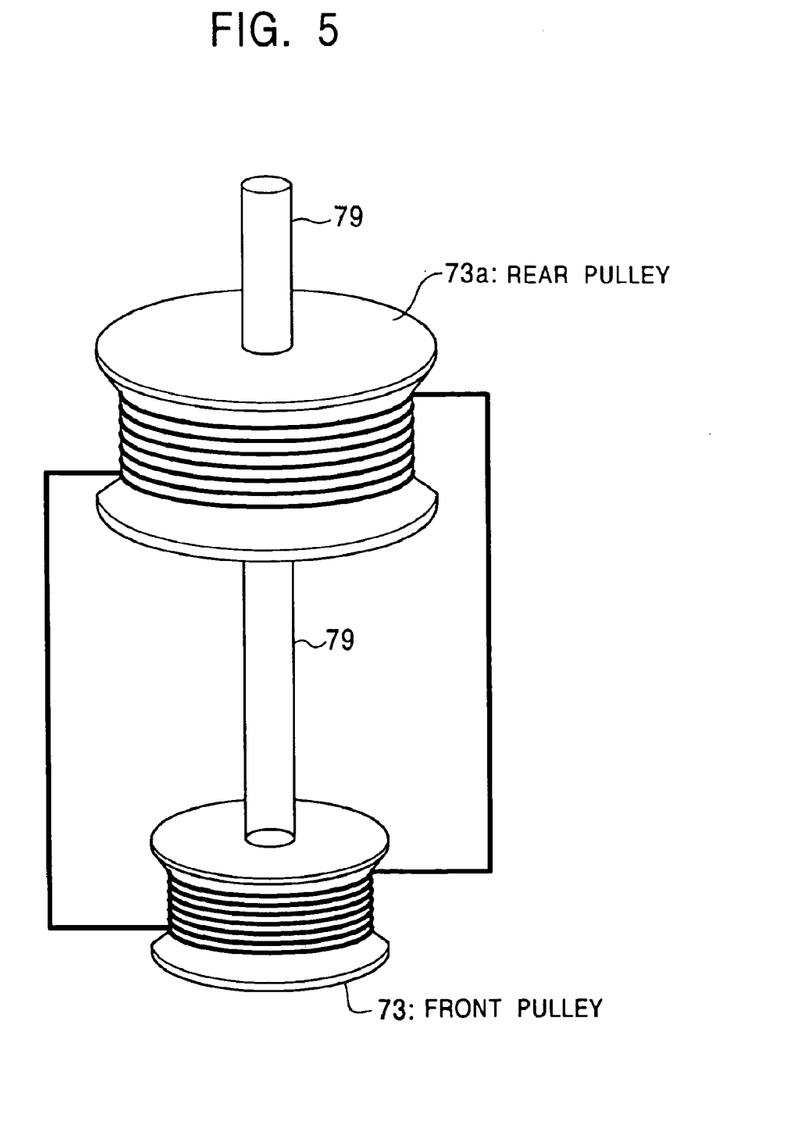
FIG. 5 illustrates a steer angle control system according to a third embodiment of the present invention, characterized by a physical structure for transmitting steering data.

Referring now to FIGS. 4 and 5, a third embodiment of the present invention will be described.

As shown in FIG. 5, the diameter of the rear pulley 73a is made greater than that of the front pulley 73, both used in the second embodiment. With this arrangement, since the pulley 73 with a small diameter can be allotted to the steering wheel 71 having a long steering stroke, a steering wheel angle can be transmitted in concert with a motion of the steering wheel 71.

Figure 6:
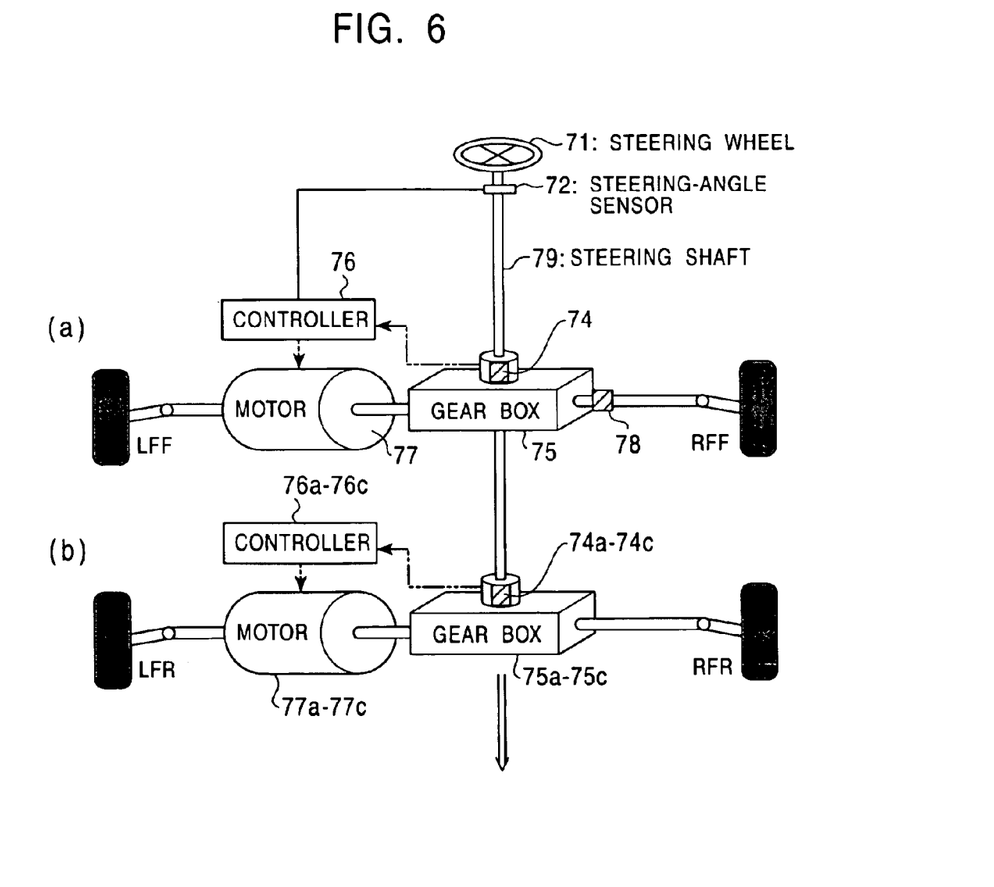
FIG. 6 illustrates a steer angle control system according to a fourth embodiment of the present invention, characterized by another physical structure for transmitting steering data.

Referring now to FIGS. 4 and 6, a fourth embodiment of the present invention will be described.

In this embodiment, a steering wheel angle is detected by using a combination of a gear box and a rod serving as physical transmitting means, instead of using the pulley in the second embodiment. A steering angle of the steering wheel 71 is transmitted to the gear box 75a and gear boxes 75b and 75c disposed on the other corresponding steering shafts from the gear box 75 via the rod. With this structure, the steering wheel angle can be transmitted by the physical transmitting means, in particular, formed by a rigid rod instead of a bendable member such as a wire, thereby making the transmitted steering wheel angle more accurate. At the same time, the controllers 76a and 76b and a controller 76c perform a feedback control by feeding back detected values of the torque sensor 74a and torque sensors 74b and 74c to the corresponding controllers, respectively.

Figure 7:
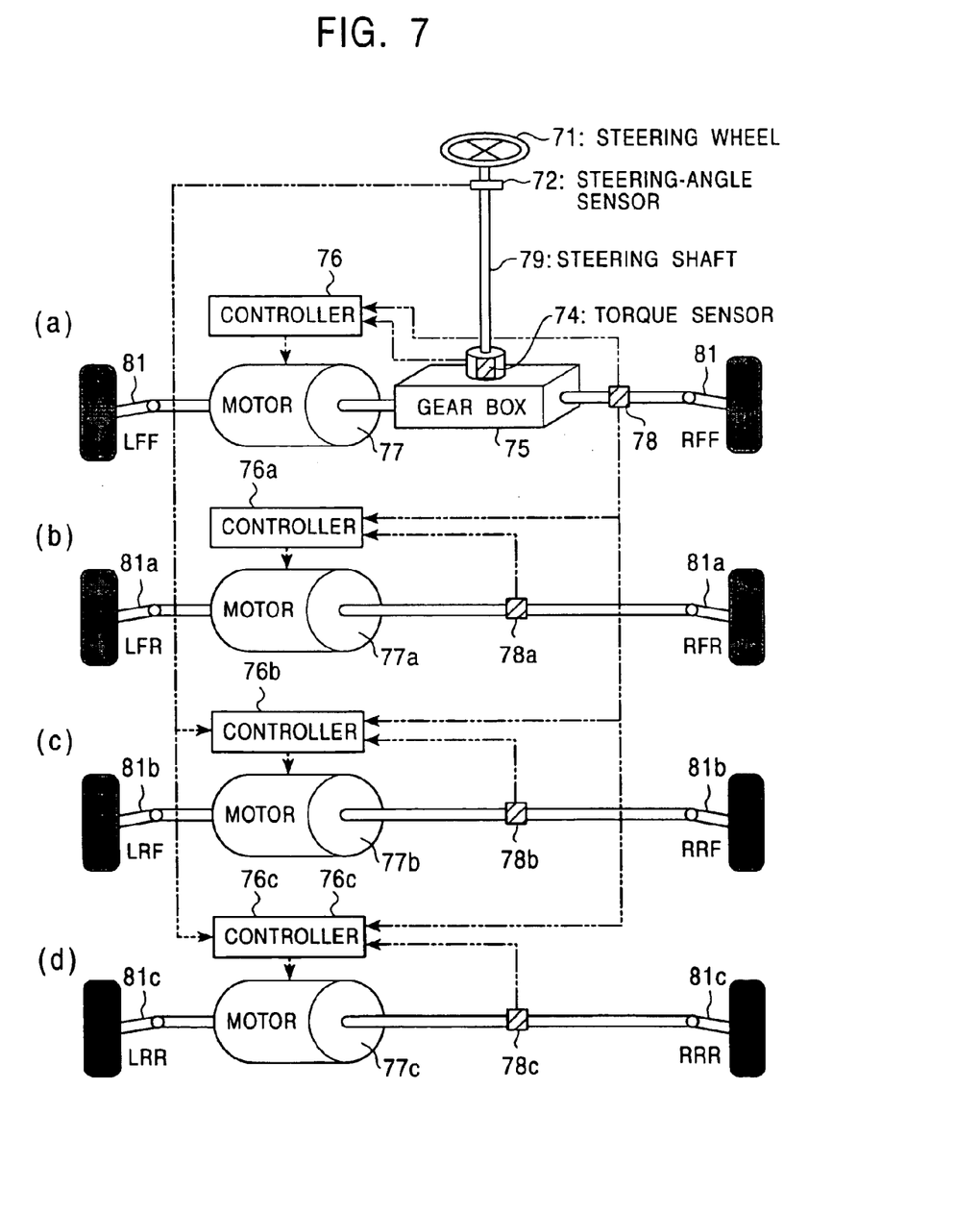
FIG. 7 illustrates a steer angle control system according to a fifth embodiment of the present invention, characterized by a consistent steering-angle control.

Referring now to FIG. 7, a fifth embodiment of the present invention will be described.

As shown in FIG. 7, this embodiment is characterized in that all steering systems are controlled on the basis of a detected value of a single steer angle sensor. The steering shaft 79 is coupled with a steering arm 81 (1) directly or (2) via the gear box 75 of a steering gear, and the steering-angle sensor 78 detects a displacement of the steering arm 81.

(1) In the case of the above-mentioned "directly"

A steering angle of the steering shaft 79 is detected by the steer angle sensor 78 and is input into all the steering systems as a sole detected value. A controller 76 and the controllers 76a, 76b, and 76c of the corresponding steering systems control the corresponding motors 77, 77a, 77b, and 77c on the basis of the detected value of the steer angle sensor 78, the detected value varying in accordance with the steering angle, so as to produce a servo effect. As a result, one detected result is used as common data for controlling each of the steering systems, thereby achieving a consistent control over all the steering systems.

(2) In the case of the above-mentioned "via the gear box 75 of a steering gear"

The controller 76 receives a steering angle of the steering shaft 79 as a detected value of the steer angle sensor 78 and controls the motor 77 on the basis of the detected value so as to drive the steering arm 81. The controller 76 feeds back the turning angle, that is, the controlled result, of the steering arm 81 to itself via the gear box 75 as a detected result of the steer angle sensor 78 so as to perform a feedback control. The detected result of the steer angle sensor 78 is used as a sole input value to all the other steering systems and the controllers 76, 76a, 76b, and 76c control the motors 77, 77a, 77b, and 77c so as to drive to rotate the steering arm 81, and steering arms 81a, 81b, and 81c, respectively. Rotation amounts of the steering arms 81, 81a, 81b, and 81c are controlled by feeding back detected results of steer angle sensor 78a and the steer angle sensors 78b and 78c to the corresponding controllers, respectively, thereby eliminating any abnormal steering.

Figure 8:
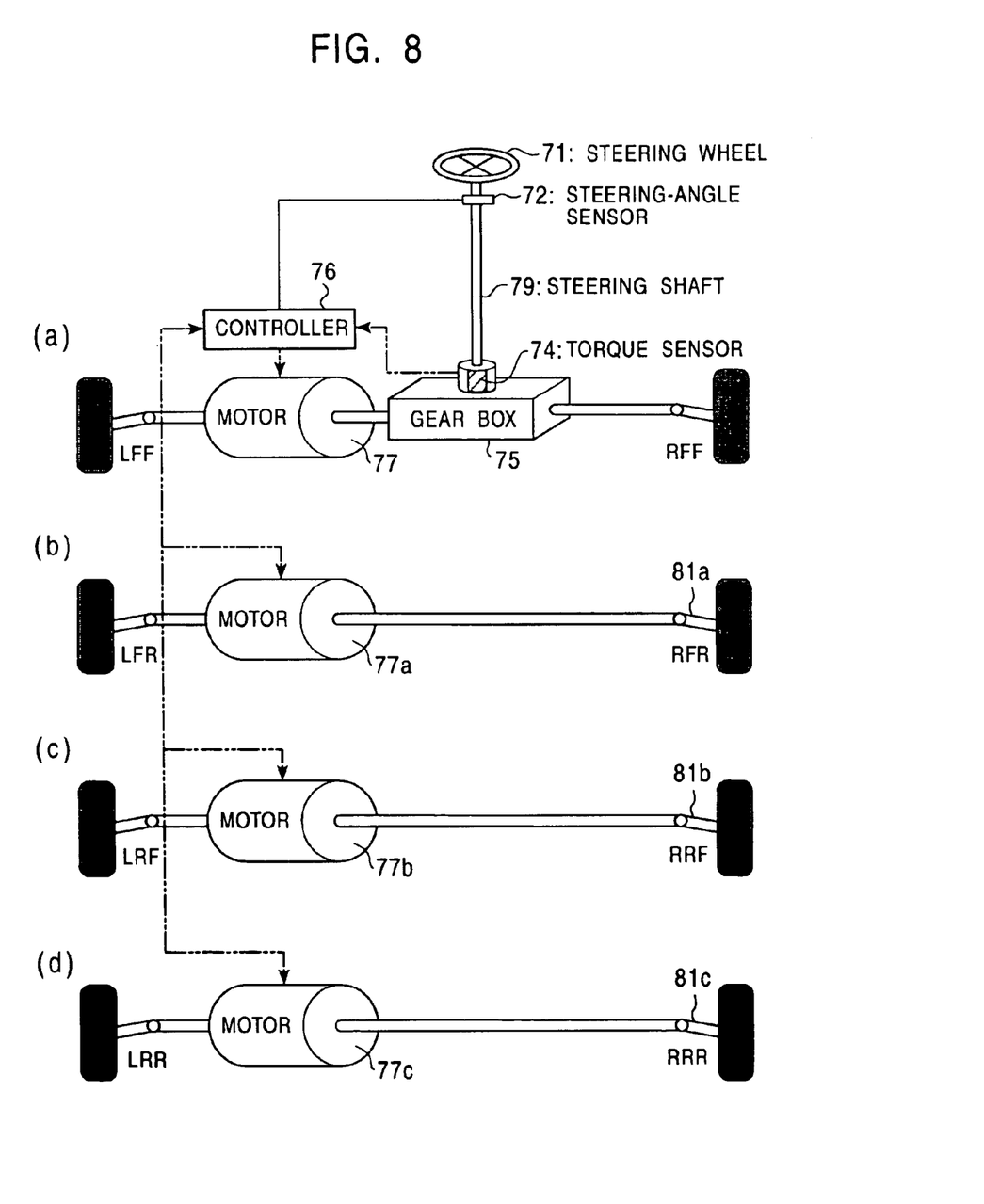
FIG. 8 illustrates a steer angle control system according to a sixth embodiment of the present invention, characterized by another consistent steer angle control.

Referring now to FIG. 8, a sixth embodiment of the present invention will be described.

This embodiment is characterized in that a single detected value of a steering angle is used as a sole input value and a sole controller controls all the steering systems.

A steering angle of the steering shaft 79 is detected by the steering wheel angle sensor 72. The controller 76 controls the motors 77, 77a, 77b, and 77c of the corresponding steering systems on the basis of the detected value. An output of the controlled motor 77 is detected by the torque sensor 74 via the corresponding steering shaft and the gear box 75 as detected data of a steering force; is fed back to the controller 76; and is controlled so as to produce a servo effect in order to reduce the steering force. In this control system, all the steering systems are controlled by a sole controller on the basis of a sole detected data of a steering angle, thereby achieving the consistent steering of the steering systems as a whole.

Figure 9:
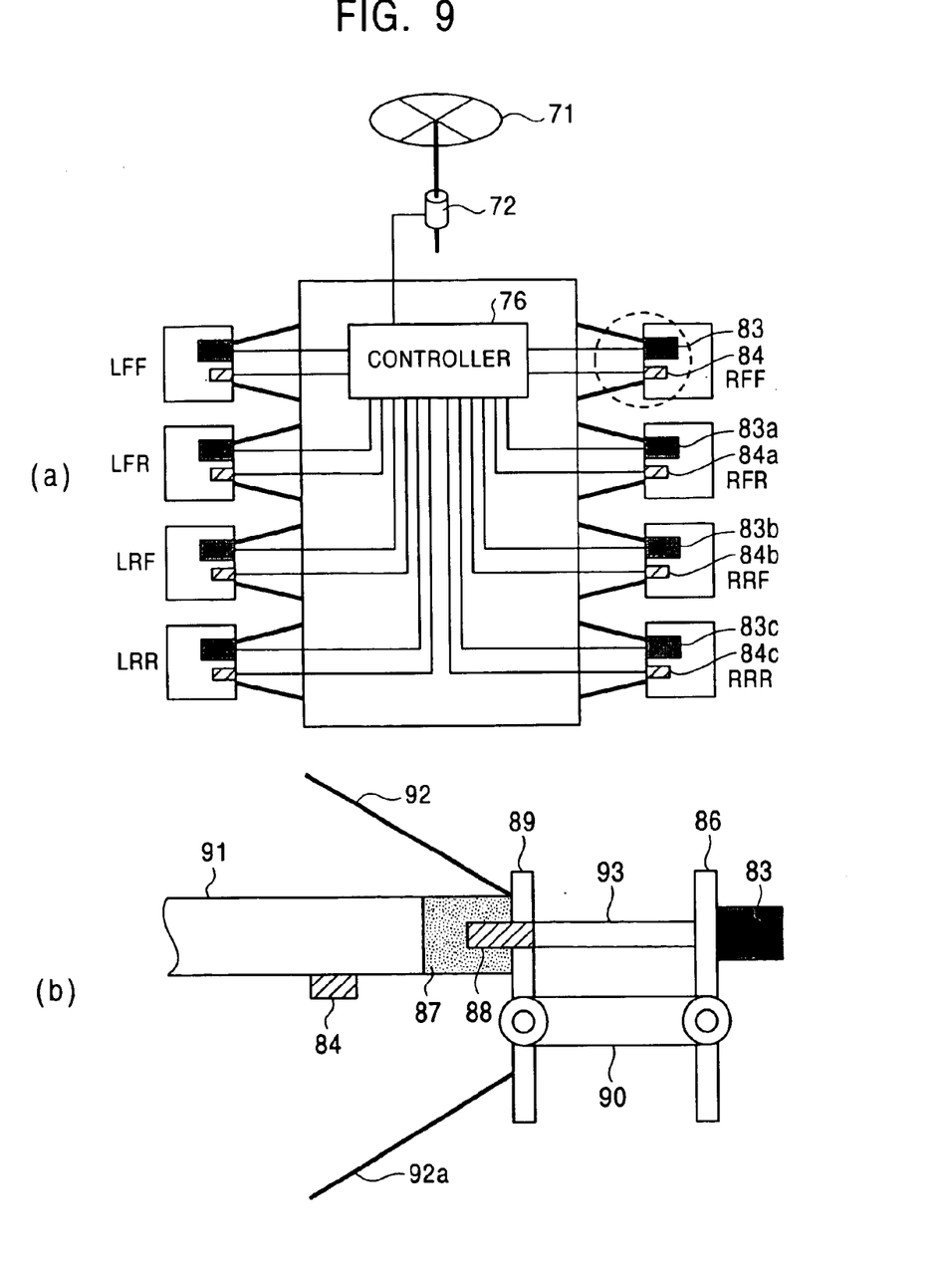
FIG. 9 illustrates a steer angle control system according to a seventh embodiment of the present invention, characterized by a simple steer angle control.

Referring now to FIGS. 4 and 9, a seventh embodiment of the present embodiment will be described.

As shown in FIG. 9, a steering angle of the steering wheel 71 or a joy stick is detected by the steering wheel angle sensor 72 and is input into the controller 76. The controller 76 controls steer angles of pairs of steering motors 83, 83a, 83b, and 83c disposed to the corresponding wheels on the basis of the detected value. Outputs of the pairs of steering motors 83, 83a, 83b, and 83c are detected by corresponding pairs of steer angle sensors 84, 84a, 84b, and 84c and are fed back to the controller 76 for controlling the steering of all wheels. The controller 76 forms a feedback control system on the basis of the detected results of the steering wheel angle sensor 72 and the steer angle sensors 84, 84a, 84b, and 84c.

Each wheel is equipped with the corresponding one of the steering motors 83, 83a, 83b, and 83c, and has a common structure in which each of these motors 83, 83a, 83b, and 83c is supported by a first supporting attachment 86; the first supporting attachment 86 is supported by a universal joint 90 having a second supporting attachment 89 interposed therebetween; and the second supporting attachment 89 is suspended by suspensions 92 and 92a. Each of the steering motors 83, 83a, 83b, and 83c is fixed to the first supporting attachment 86, and the motor has a male screw groove 88 formed on the end part, opposite to the motor, of its shaft passing through the first supporting attachment 86. A cylindrical member 91 having a female screw portion 87 formed therein which screws together with the male screw groove 88 is swingably and rotatably supported by the second supporting attachment 89. When the steering motors 83, 83a, 83b, and 83c are driven to rotate normally or reversely, the male screw groove 88 of the motor axle of each motor moves in or out from the female screw portion 87 of the cylindrical member 91 rotatably supported by the second supporting attachment 89 in a state in which the male screw groove 88 screws together with the female screw portion 87, thereby performing a steering control of each wheel. The steer angle sensors 84, 84a, 84b, and 84c are disposed to the corresponding cylindrical members 91 and detect steering angles of the steering motors 83, 83a, 83b, and 83c in accordance with the moving distances of the shafts of the steering motors 83, 83a, 83b, and 83c, respectively, relative to the corresponding cylindrical members 91, thereby achieving a compact steering mechanism having a simple structure. Also, a direct steering control can be performed by a control command from a controller, thereby achieving an accurate control with a small margin of control error.

Although the steering mechanism for eight wheels has been described in the above-mentioned embodiments, the one for six wheels basically has the same structure, and the same handling and operating configuration as those of the steering mechanism for eight wheels. Also, although an in-wheel motor is used as a driving source in this embodiment, a gasoline engine or a hybrid engine may be used.

The present invention is not limited to the above-described embodiments, and a variety of modifications based on the spirit of the present invention shall not be excluded from the scope of the present invention.

As described above in detail, the present invention offers the following advantages.

(A) In an electric car equipped with tandem wheel suspensions, a steering mechanism is formed so as to perform a smooth turning motion. That is, in a car comprehensively performing a drive control and a steering control, a general controller and a motor controller are independently disposed from each other, the former for comprehensively processing signals of variety of sensors and outputting signals for performing a drive control and a steering control on the basis of the car behavior, and the latter for controlling a motor current of an electric motor of an electric wheel steering means, thereby making the control system of the general controller small and compact.

By independently providing the motor controller as described above, a large motor current of the electric wheel steering means can be optimally controlled. Also, the motor controller can easily respond to the presence or absence of the electric wheel steering means, a change in load capacities between small and large cars, and the like. In addition, a smooth turning and steering motion of the car equipped with the tandem wheel suspensions can be achieved.

(B) In an electric car equipped with tandem wheel suspensions, by providing a coupling mechanism for coupling a first axle with each of other axles, a smooth turning motion can be achieved.

(C) In an electric car equipped with tandem wheel suspensions, by providing steering mechanisms to at least two axles, a smooth turning motion can be achieved.

(D) By independently providing a motor controller, a large motor current of electric wheel steering means can be optimally controlled. Also, the motor controller can easily respond to the presence or absence of the electric wheel steering means, a change in load capacities between small and large cars, and the like. In addition, a smooth turning and steering motion of the car equipped with the tandem wheel suspensions can be achieved.

(E) With the advantages of above (A), (B), (C), and (D), the operability of the car improves and a smooth turning motion can be achieved, thereby resulting in higher ride quality.

INDUSTRIAL APPLICABILITY

Since a steering mechanism of an electric car according to the present invention has tandem wheel suspensions and steering means for each pair of right and left wheels, a smooth turning motion can be achieved, whereby the steering mechanism is especially suitable for use in an electric car which does not emit an exhaust gas and hence prevents the global warming.

What is claimed is:

1. A steering mechanism of an electric car, comprising at least two sets of tandem wheels formed by a front wheel portion including front front-wheels (LFF, RFF) and front rear-wheels (LFR, RFR), and a rear wheel portion including rear front-wheels (LRF, RRF) and rear rear-wheels (LRR, RRR) of an eight-wheel vehicle, a steering shaft (79) producing a steering angle for steering the front front-wheels (LFF, RFF), mechanical transmitting means for transmitting a reduced angle of the steering angle of the steering shaft (79) to a steering mechanism of the front rear-wheels (LFR, RFR) in accordance with a distance between the front front-wheels (LFF, RFF) and the corresponding front rear-wheels LFR, RFR, a steer angle sensor (72) disposed to the steering shaft (79), and steering motors (77*b*, 77*c*) for controlling the rear front-wheels (LRF, RRF) and the rear rear-wheels (LFF, RRR) of the eight-wheel vehicle on the basis of an output of the steering angle sensor (72).

2. The steering mechanism of an electric car according to claim 1, wherein an input signal for controlling the steering motors (77*b*, 77*c*) of the rear wheel portion of the eight-wheel vehicle is a variable combination of an output signal of the steering angle sensor (72), speed signals of the respective wheels, steer angle signals of the respective wheels, a yaw rate signal, a longitudinal acceleration signal, and a lateral acceleration signal, in accordance with a control characteristic.

3. The steering mechanism of an electric car according to claim 1, wherein a rotation amount of the steering shaft (79) is mechanically transmitted to the steering means of the front rear-wheels (LFR, RFR) of the eight-wheel vehicle, wherein the steering means of the front rear-wheels (LFR, RFR) includes a torque sensor (74) for detecting a steering force transmitted from the steering shaft (70) and a steering motor (77) for reducing the steering force.

* * * * *